Nov. 21, 1967  P. M. THAYER ETAL  3,353,677
CIRCULAR LIQUID TREATMENT PLANTS
HAVING SERVICE PLATFORMS
Filed March 8, 1965  3 Sheets-Sheet 3
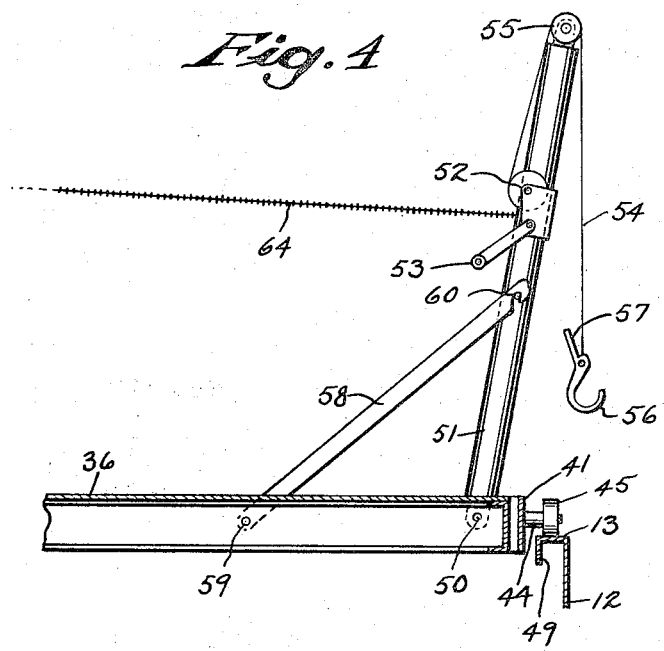
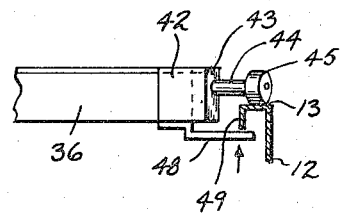
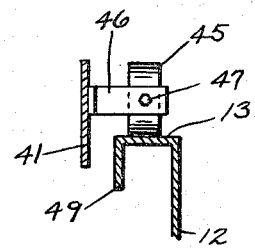
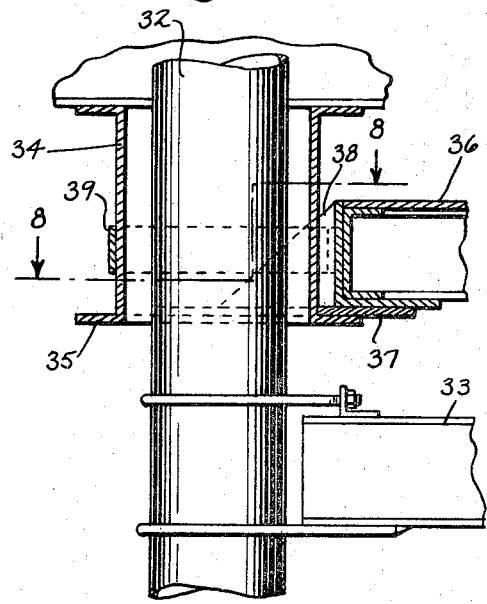
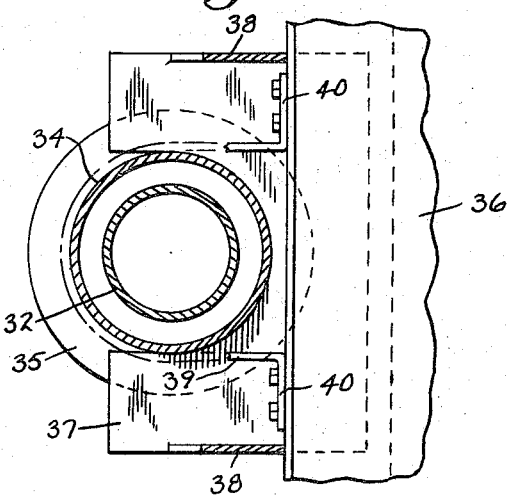
INVENTORS
Paul M. Thayer
Frank L. Schmit
Donald T. Frainor
BY
Morsell & Morsell
ATTORNEYS

United States Patent Office 3,353,677
Patented Nov. 21, 1967

3,353,677
CIRCULAR LIQUID TREATMENT PLANTS HAVING SERVICE PLATFORMS
Paul M. Thayer, Milwaukee, Frank L. Schmit, Saukville, and Donald T. Trainor, Milwaukee, Wis., assignors, by mesne assignments, to Water Pollution Control Corporation, Milwaukee, Wis., a corporation of Wisconsin
Filed Mar. 8, 1965, Ser. No. 438,007
6 Claims. (Cl. 210—220)

This invention relates to improvements in circular liquid treatment plants having service platforms.

In the operation of sewage treatment plants, the air diffusion devices tend to clog and must be periodically serviced. In addition, it is necessary, from time to time, to service the scum skimmer, the scum trough, the return air lift, the weirs, the overflow launder, and other equipment. In many localities regulatory agencies require that provision be made for servicing these devices without dewatering the tank. In treatment plants which have rectangular tanks there are usually walk-ways between or around the tanks which are of ample size so there is little problem. Circular tanks, on the other hand, which are desirable for certain types of installations because of structural and operating economies, present servicing problems because the service man must walk out on narrow rims to reach certain items. Falling into the sewage liquid under these treacherous conditions is not uncommon.

It is a general object of the present invention to provide an improved circular liquid treatment plant wherein there is novel means to facilitate the servicing of devices in any location without difficulty.

A more specific object of the invention is to provide, in a circular sewage treatment plant having a stationary bridge, a service platform having its inner end supported from the bridge for pivotal movement above the center of the tank, and having means at its outer end coacting with a circular tank rim for movably supporting said outer portion of the platform on said rim. Thus the service platform may be rotated to a selected position on said rim where a particular device may be most conveniently serviced.

A further object of the invention is to provide a treatment plant as above described wherein there is a central torque tube and wherein the inner end of the service platform is supported from the bridge for independent pivotal movement about the axis of the torque tube, the outer portion of the service platform being movably supported by wheels or the like which travel on a circular rim of the treatment tank.

A further object of the invention is to provide a liquid treatment plant as above described wherein the outer end of the rotatable service platform supports a winch-equipped boom or gin pole to facilitate the lifting of heavy devices during servicing.

A further object of the invention is to provide a liquid treatment plant as above described wherein there is means for locking the platform in a selected position of rotation, and additional means for stabilizing the outer portion of the platform when items are being lifted by the gin pole.

A further object of the invention is to provide a liquid treatment plant of the class described having a stationary bridge extending diametrically across a circular tank, wherein there is a swingable service platform supported for rotation from the underside of the bridge, the outer end of the service platform having a gin pole which is collapsibly supported in such a way that the gin pole may be moved to a position where it does not interfere with rotation of the service platform beneath the stationary bridge when the platform is being moved to a selected position.

With the above and other objects in view, the invention consists of the improved circular liquid treatment plant having a service platform, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 4 is a sectional view taken approximately on the line 4—4 of FIG. 3, showing the gin pole in elevated, operable position;

FIG. 5 is a fragmentary sectional view taken on the line 5—5 of FIG. 3;

FIG. 6 is a fragmentary sectional view taken on the line 6—6 of FIG. 3;

FIG. 7 is a fragmentary sectional view taken on the line 7—7 of FIG. 3; and

FIG. 8 is a fragmentary sectional view taken on the line 8—8 of FIG. 7.

Figure 1:
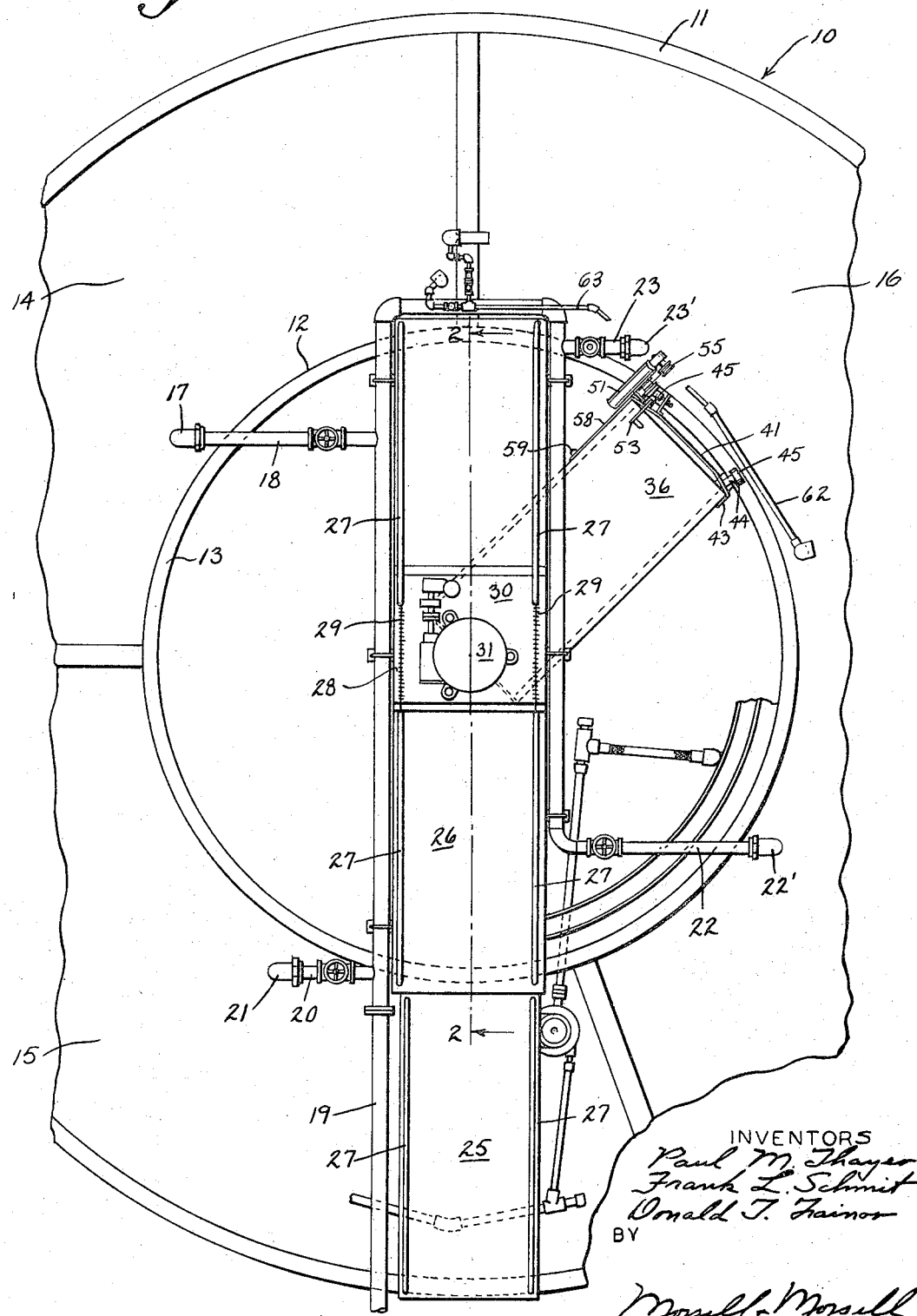
FIG. 1 is a top plan view of a circular sewage treatment plant, parts of the outer tank being broken away.
Figure 2:
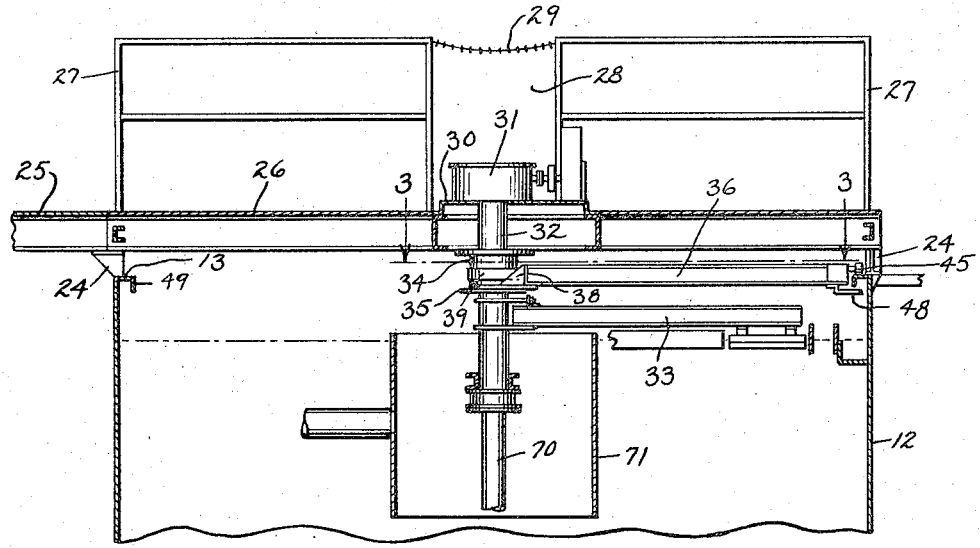
FIG. 2 is a sectional view taken on the line 2—2 of FIG. 1, the service platform, however, being swung to a position of parallelism with and beneath the stationary bridge.

Referring more particularly to the drawings, the improved sewage treatment plant includes an outer tank 10 having an upstanding wall with a rim 11 and a concentric central settling tank 12 having a circular rim 13 which is preferably an inverted U in cross-section, as shown in FIGS. 4, 5 and 6. Between the central tank 12 and the wall 11 of the outer tank are arcuate treatment chambers such as an aeration chamber 14, a re-aeration chamber 15, and a digester chamber 16. In each of these chambers are aeration devices, one of these being supported in suspended position in the chamber 14 by an L-coupling 17 on the end of a valve controlled branch pipe 18 leading from a main air pipe 19. Another valve controlled branch pipe 20 has an L-coupling 21 which detachably supports an aeration device for the chamber 15. Still other pipes 22 and 23 have L-shaped couplings 22′ and 23′ which detachably support aeration devices for the chamber 16. These aeration devices include horizontal pipes in the sewage (not shown) having a plurality of diffuser pipes projecting therefrom. These diffuser pipes, which are well known in the art, have a plurality of relatively small air holes which may eventually become clogged. When this occurs the couplings 17, 21, 22′ or 23′ must be manipulated to free the aerator assembly and permit lifting the device to an elevated position out of the liquid whereby the diffuser pipes may be serviced. Usually this involves the replacement of the diffuser pipes with clean ones, the clogged pipes being removed for subsequent cleaning preparatory to reuse. In a circular treatment plant of the type under consideration, the rim 13 of the central tank may be as narrow as 4″. It is, therefore, extremely difficult to service the aeration assemblies or other items while standing on this narrow rim.

Supported in elevated position over an outer tank portion such as the tank portion 15, on brackets 24 or the like, which project upwardly from the inner and outer rims 11 and 13, is a stationary bridge section 25, the inner end of which abuts one end of a central bridge section 26 which is similarly supported in somewhat elevated position on brackets 24 and which extends diametrically of the central settling tank 12. The stationary bridge 25 may have railings 27, and there may be gate openings 28 in the railings which are normally guarded by detachable chains 29. The air pipe 19 may extend along and be supported on one side of the bridge, as shown in FIG. 1, may bend around one end thereof, and then extend back along the other side for a required distance, as illustrated.

Suitably mounted on the stationary platform section 26, centrally of the tanks, is a mounting plate 30 supporting a suitable drive assembly 31 for a sludge collector torque tube 32, the latter projecting rotatably through the bridge. A skimmer arm 33 has its inner end rigidly connected to the torque tube 32 to rotate when the torque tube is rotated by the drive mechanism 31. A driven inner shaft 70 projects from the lower end of the torque tube through the open bottom of a stilling well 71 where it is connected to a rotor in the bottom of the settling tank 12.

Referring now more particularly to FIGS. 7 and 8, connected to the underside of the stationary bridge section 26, and concentric with and around the torque tube, is a stationary sleeve 34 having an annular bottom flange 35.

Figure 3:
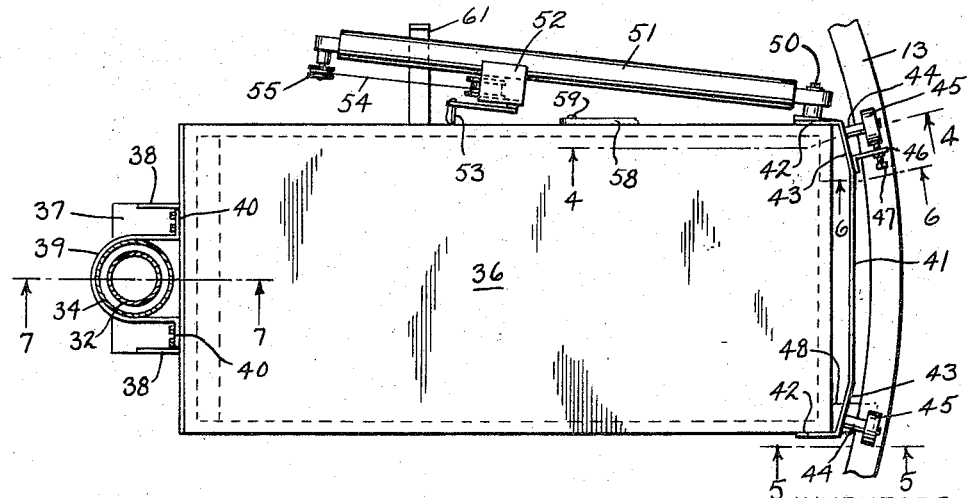
FIG. 3 is a sectional view taken approximately on the line 3—3 of FIG. 2, showing the gin pole in collapsed position.

The improved service platform is best shown in FIG. 3. It is preferably a rectangular platform member 36 of any suitable construction. Projecting from its inner end is a U-plate 37 having suitable supporting gussets 38, and there is a strap member 39 above the plate 37 whose ends are laterally flanged as at 40 and connected to the inner end of the platform. The U-plate 37 rotatably fits around the sleeve 34, as shown in FIGS. 7 and 8, and is supported on the lower flange 35 of the sleeve. In addition, the strap 39 is adapted to rotate around the sleeve 34, as is clear from FIG. 7.

At the outer end of the service platform is a steel bar 41 having inwardly flanged ends 42 which are welded or otherwise secured to the outer ends of the sides of the platform 36. The bar 41 has sections 43 which are angled to approximately match the curvature of the rim 13. Projecting from these angled sections are stud axles 44 which rotatably support wheels 45 in such a position that the wheels roll on the rim 13, as is clear from FIGS. 3–6. An additional bracket 46, which projects out from one of the angled sections 43, has a set screw 47 threaded therethrough which may be manipulated when it is desired to lock one of the wheels 45 against rolling action.

Also projecting from the outer end of the platform 36 is a lip 48 which is adapted to ride beneath the downturned flange 49 of the rim 13, as shown in FIG. 5, to restrain upward tilting movement of this corner of the platform for a purpose to be hereinafter described.

Pivoted adjacent the opposite corner of the platform, as at 50, FIG. 4, is the lower end of a gin pole 51. The gin pole suitably supports a winch 52 having a crank 53. A cable or chain 54 leading from the winch extends over a top sheave 55. The lower end of the line 54 carries a hook 56, the latter preferably having an upwardly projecting stem 57. A brace 58 has its lower end pivoted to a side of the service platform 36, as at 59, and has its upper end detachably connectable with the gin pole, as at 60, to releasably maintain the same in the operative position of FIG. 4. When it is desired to collapse the gin pole, the brace 58 is disconnected and the gin pole is lowered into a horizontal position on a receiving bracket 61 which projects from the side of the platform, as shown in FIG. 3.

*Operation*

In use of the improved treatment plant, as before mentioned, it periodically becomes necessary to uncouple the fittings 17, 21, 22′ or 23′ in order to lift up an aeration assembly to service the diffuser tubes. It may also be necessary to service the scum return air lift 62, the sludge return air lift 63, the scum skimmer 33, or some other item. With the present invention the service man can walk out onto the stationary bridge section 26, detach one of the gate chains 29, and walk out onto the rotatable service platform 36. He may then manually push the platform to bring its outer end to a selected position on the rim 13 of the settling tank for servicing of the particular item. Prior to walking out on the service platform, it may be manipulated to a selected side of the stationary bridge 26, the gin pole being in the collapsed position of FIG. 3 to permit passage beneath the bridge. After the service platform has been rotated to a selected position, the wheel-locking screw 47 may be manipulated to lock one of the wheels against rotation, the gin pole having been previously elevated to the position of FIG. 4. The coupling in connection with a particular item to be serviced is loosened and then, with the hook 56 lowered and in engagement with the particular part to be raised out of the sewage, the crank 53 of the winch is turned to raise the item out of the tank. It may be then swung onto the platform for servicing. In order to facilitate engaging a particular item, a tubular pole may be engaged over the hook stem 57 to help in guiding the hook. During lifting of any relatively heavy assembly, such as an aeration assembly, there is a stress on the service platform which tends to create a lifting movement on the front corner which is opposite the gin pole. Due to the use of the lip 48 shown in FIG. 5, this latter corner is effectively braced and overturning of the platform is prevented.

In order to protect service men on the service platform, a detachable chain 64 may be temporarily connected at one end to the gin pole, and at its other end to the bridge railing 27. The service platform is large enough to permit interchange of diffuser tubes while on the platform, and the aeration devices or other item can then be reassembled in the tank.

It is apparent from the above that the improved invention makes a circular sewage treatment plant entirely practical, as it provides means for readily servicing items in any location while making it convenient and safe for the service man. It is also apparent that when the gin pole is collapsed that the service platform may be readily rotated as much as 360° to a selected location.

Various changes and modifications and adaptations with circular treatment tanks for other liquids may be made without departing from the spirit of the invention, and all of such changes and adaptations are contemplated as may come within the scope of the claims.

What we claim is:

1. In a sewage treatment device having an outer tank and having a circular inner tank with a circular rim, there being devices in said outer tank which require servicing, including aerators, outwardly of said circular rim of said inner tank, an externally accessible stationary bridge over said device having a portion over the center of said inner tank, a service platform having an inner end supported for rotation on a vertical axis concentrically of said inner tank and positioned so that it is accessible for boarding from said bridge, means on an outer portion of said service platform coacting with the circular rim of said inner tank supporting said outer portion of the platform for movement on said rim, said platform being of substantially less length than the distance between the center of the inner tank and the rim of the outer tank so as to render a major portion of the outer tank accessible to a service man on the outer end of said platform whereby he may service said aerators in said outer tank from said outer end of the platform.

2. A sewage treatment device as claimed in claim 1 in which there is means for locking the service platform against rotation while servicing is being performed.

3. A sewage treatment device as claimed in claim 1 in which the length of the service platform is about the same as the radius of the inner tank.

4. A sewage treatment device as claimed in claim 1 wherein there is an elongated lifting device supported on the outer end of the platform in a position to lift devices to be serviced from said outer tank onto said outer end of the platform.

5. A sewage treatment device as claimed in claim 4 in which the service platform is supported for rotation beneath said stationary bridge and wherein said lifting device is collapsibly supported to permit rotation of the outer end of the service platform beneath the bridge without interference from the lifting device.

6. A sewage treatment device as claimed in claim 5 wherein there is means for locking the service platform against rotation while the lifting device is in operative position.

References Cited

UNITED STATES PATENTS

| | | | |
|---|---|---|---|
| 2,427,092 | 9/1947 | Kamp | 210—530 X |
| 2,457,191 | 12/1948 | Wigton | 210—530 X |
| 2,723,760 | 11/1955 | Talbot | 210—530 |
| 2,901,114 | 8/1959 | Smith et al. | 210—256 X |

FOREIGN PATENTS 521,876   6/1940   Great Britain.

REUBEN FRIEDMAN, *Primary Examiner.*

J. DE CESARE, *Assistant Examiner.*